(12) United States Patent
Kim

(10) Patent No.: US 8,413,971 B2
(45) Date of Patent: Apr. 9, 2013

(54) DEVICE FOR REMOVING PARTICLE FROM CONNECTING ROD

(75) Inventor: Taewoong Kim, Asan (KR)

(73) Assignee: Hyundai Motor Company, Seoul (KR)

( * ) Notice: Subject to any disclaimer, the term of this patent is extended or adjusted under 35 U.S.C. 154(b) by 891 days.

(21) Appl. No.: 12/533,123

(22) Filed: Jul. 31, 2009

(65) Prior Publication Data

US 2010/0096791 A1 Apr. 22, 2010

(30) Foreign Application Priority Data

Oct. 22, 2008 (KR) .................. 10-2008-0103704

(51) Int. Cl.
*B23Q 1/64* (2006.01)
(52) U.S. Cl.
USPC .................. 269/56; 269/43; 269/32; 269/228
(58) Field of Classification Search .............. 269/43, 269/45, 6, 3, 71, 55, 60, 24, 27, 228
See application file for complete search history.

(56) References Cited

U.S. PATENT DOCUMENTS

| | | | | |
|---|---|---|---|---|
| 4,189,817 A | * | 2/1980 | Moebius | 29/237 |
| 5,201,501 A | * | 4/1993 | Fassler | 269/32 |
| 5,305,510 A | * | 4/1994 | Croft et al. | 29/237 |
| 6,575,512 B2 | * | 6/2003 | Moilanen et al. | 294/198 |
| 7,066,458 B2 | * | 6/2006 | McIntosh et al. | 269/34 |
| 7,103,951 B2 | * | 9/2006 | Uzun | 29/227 |
| 2008/0209708 A1 | | 9/2008 | Kawamura et al. | |
| 2010/0096791 A1 | * | 4/2010 | Kim | 269/56 |

FOREIGN PATENT DOCUMENTS

KR 2002-0042725 6/2002

* cited by examiner

*Primary Examiner* — Lee D Wilson
(74) *Attorney, Agent, or Firm* — Edwards Wildman Palmer LLP; Peter F. Corless

(57) ABSTRACT

A device for removing particles from a connecting rod includes a clamp for fixing a rod of a connecting rod disposed on a base plate, a vibration cylinder disposed to the clamp and a driving unit connected to the vibration cylinder for reciprocating a cap of the connecting rod according to driving of the vibration cylinder.

3 Claims, 3 Drawing Sheets

DEVICE FOR REMOVING PARTICLE FROM CONNECTING ROD

CROSS-REFERENCE TO RELATED APPLICATION

This application claims priority to and the benefit of Korean Patent Application No. 10-2008-0103704, filed on Oct. 22, 2008, the entire contents of which are incorporated herein by reference.

BACKGROUND OF THE INVENTION (a) Field of the Invention

The present invention relates to a device that is used in splitting process of a connecting rod. More particularly, the present invention relates to a device for removing particles from a connecting rod.

(b) Description of the Related Art

A connecting rod made of sintered materials has been widely used in an internal combustion engine for many reasons that manufacturing process of the engine can be simplified, manufacturing costs can be reduced and factory automation can be facilitated because it can be made with high precision. Also, the weight of the sintered connecting rod can be managed precisely so that segmented weight grade management or a boss for regulating weight of a connecting rod is not required.

If fracture splitting is applied when the sintered connecting rod is split into a rod and a cap, displacement (allowance) of the rod and the cap can be reduced and stability of an oil film of a connecting rod bearing can be enhanced.

In the splitting process of the sintered connecting rod, it is important to remove particles generated in cutting surfaces.

If the particles are not removed sufficiently, complete contact of the rod and the cap is hardly made. Also, after engaging the connecting rod by a bolt, if the particles come out, an engine can be damaged.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device for removing particles of a connecting rod that can efficiently remove particles in a splitting process of a connecting rod with reduced impact.

A device for removing particles of a connecting rod according to an exemplary embodiment of the present invention may include a clamp for fixing a rod of a connecting rod disposed on a base plate, a vibration cylinder disposed to the clamp and a driving unit connected to the vibration cylinder for reciprocating a cap of the connecting rod according to movement of the vibration cylinder.

The driving unit may include a link portion and a connecting bracket. A center portion of the link portion is pivotally connected to the clamp and a first end thereof is connected to the vibration cylinder. The connecting bracket is configured to the second end of the link portion for holding the cap.

The device may further include a fixing block that is disposed on the base plate and supports an end of the rod.

The device may further include a nut runner that holds a bolt, which engages the cap and the rod when the cap reciprocates.

The device for removing particles of a connecting rod may clamp a rod of a connecting rod and may reciprocate a cap of the connecting rod so that the device takes up relatively less space.

The device can remove particles with relatively less driving torque and removing efficiency can be enhanced.

When a cap is vibrated, a bolt is fixed, so that impact of a bolt and a tap can be reduced.

Figure 1:
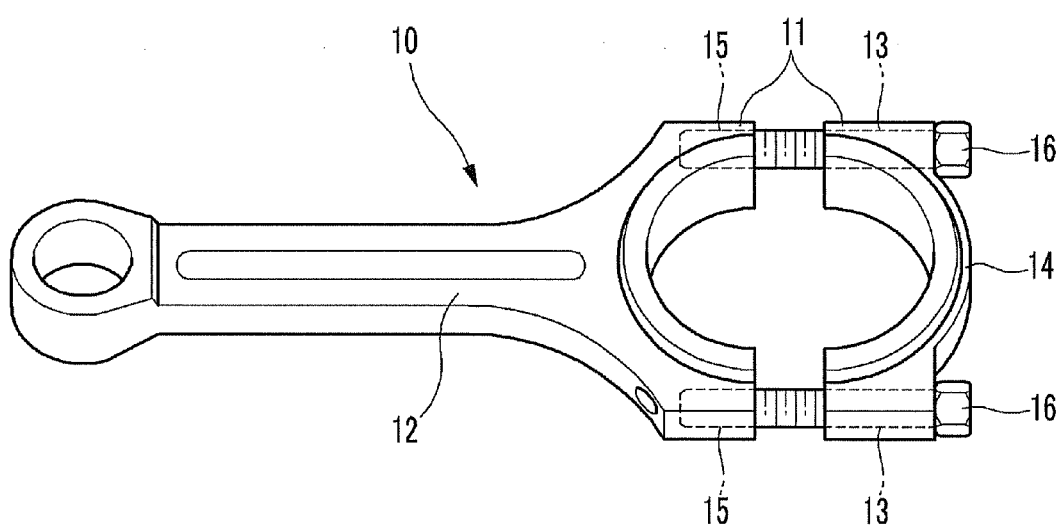
FIG. 1 is a perspective view of a connecting rod including a rod and a cap.

Reference numerals set forth in the Drawings includes reference to the following elements as further discussed below:

| | |
|---|---|
| 10: connecting rod | 11: head portion |
| 12: rod | 13: engaging hole |
| 14: cap | 15: tap |
| 16: bolt | 20: base plate |
| 22: clamp | 23: clamp protrusion |
| 24: vibration cylinder | 26: fixing block |
| 27: center portion | 28: link portion |
| 29: first end | 30: second end |
| 40: nut runner | 50: connecting bracket |

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

FIG. 1 is a perspective view of a connecting rod including a rod and a cap.

A connecting rod 10 is integrally formed. A head portion 11 of the integrally formed connecting rod 10 is split into a rod 12 and a cap 14.

The rod 12 and the cap 14 are then engaged by a bolt 16. More specifically, the cutting surfaces of the rod 12 and the cap 14 formed when the connecting rod 10 is split come in contact cohesively and then the rod 12 and the cap 14 engaged by the bolt 16 by inserting the bolt 16 into a tap 15 formed to the rod 12 through an engaging hole 13 formed to the cap 14.

After the split into the rod 12 and the cap 14 and before the engagement of the rod 12 and the cap 14, particles are removed therefrom.

Figure 2:
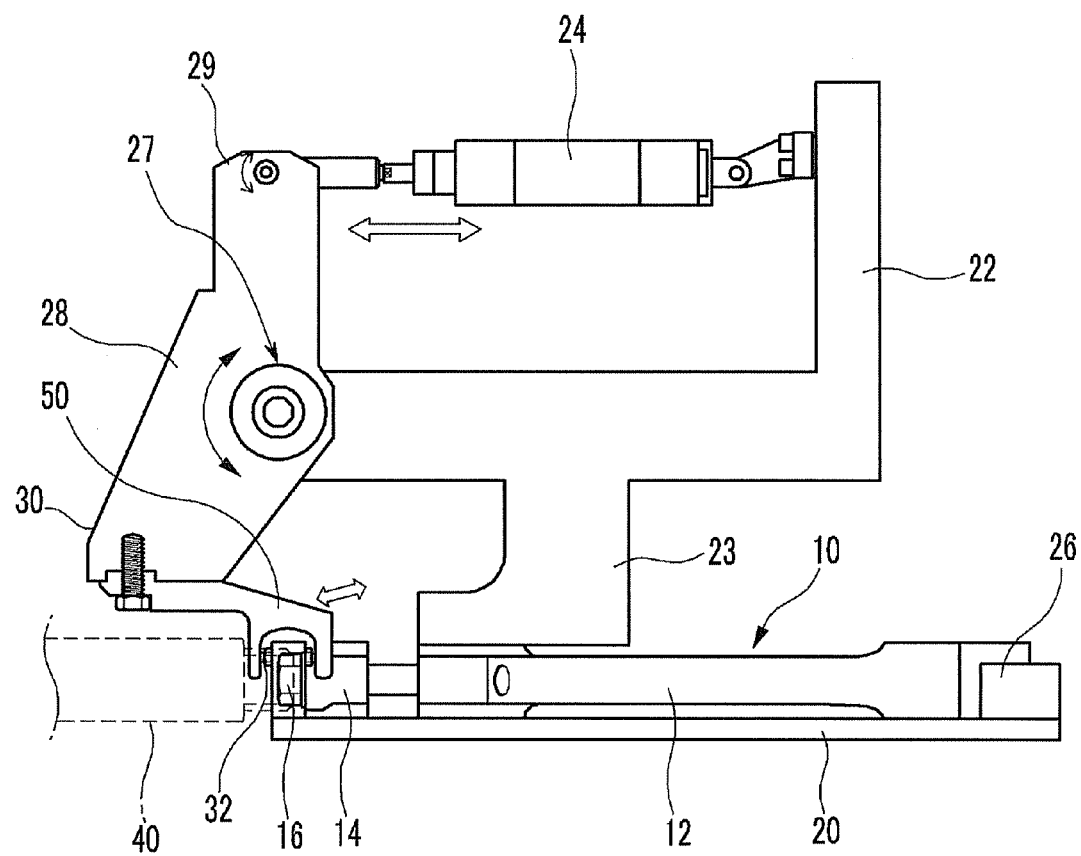
FIG. 2 is a side view of a device for removing particles of a connecting rod according to an exemplary embodiment of the present invention.

FIG. 2 is a side view of a device for removing particles of a connecting rod according to an exemplary embodiment of the present invention.

Referring to the drawing, a device for removing particles of a connecting rod according to an exemplary embodiment of the present invention includes a clamp 22 for fixing the rod 12 of the connecting rod 10 disposed on a base plate 20, a vibration cylinder 24 disposed to the clamp 22, and a driving unit connected to the vibration cylinder 24 for reciprocating the cap 14 of the connecting rod 10 according to movement of the vibration cylinder 24.

The base plate 20 is a working table for setting the connecting rod 10.

On one upper end part of the base plate 20, a fixing block 26 for supporting an end of the rod 12 is disposed.

An end of the fixing block 26 may be bended as "V" shape and support the end of the rod 12.

The clamp 22 is movable up and down on the base plate 20.

A clamp protrusion 23 is protruded from the clamp 22 for fixing the rod 12 on the base plate 20.

The driving unit receives driving torque from the vibration cylinder 24 and reciprocates the cap 14.

The driving unit includes a link portion 28 and a connecting bracket 50. A center portion 27 of the link portion 28 is pivotally disposed to the clamp 22, a first end 29 of the link portion 28 is connected to the vibration cylinder 24, and a second end 30 of the link portion 29 is connected to the connecting bracket 50 for holding the cap 14.

The link portion 28 pivots around the center portion 27 and reciprocates the cap 14 fixed by the connecting bracket 50 by expansion and contraction of the vibration cylinder 24.

The vibration cylinder 24 is connected to an upper part of the clamp 22 and the first end 29 of the link portion 28. The vibration cylinder 24 can be driven by, e.g., air or hydraulic pressure and it is not limited to a specific type.

The connecting bracket 50 for connecting the cap 14 with the link portion 28 is extended to the cap 14 and holds the cap 14. Ends of the connecting bracket 50 wrap the cap 14 and a fixing member such as an engage bolt 32 may be used to fixed the cap 14.

A nut runner 40 is disposed at a side of the cap 14 and the nut runner 40 may engage or disengage a bolt 16 that connects the cap 14 and the rod 12. Also, the nut runner 40 can hold the bolt 16 when the cap 14 is vibrated for removing the particles.

Due to the bolt 16 fixed by the nut runner 40, the bolt 16 and the tap 15 can be protected from an impact according to the vibration. As the cap 14 is vibrated while the bolt 16 is fixed, impact of the bolt 16 and the tap 15 can be reduced.

Figure 3:
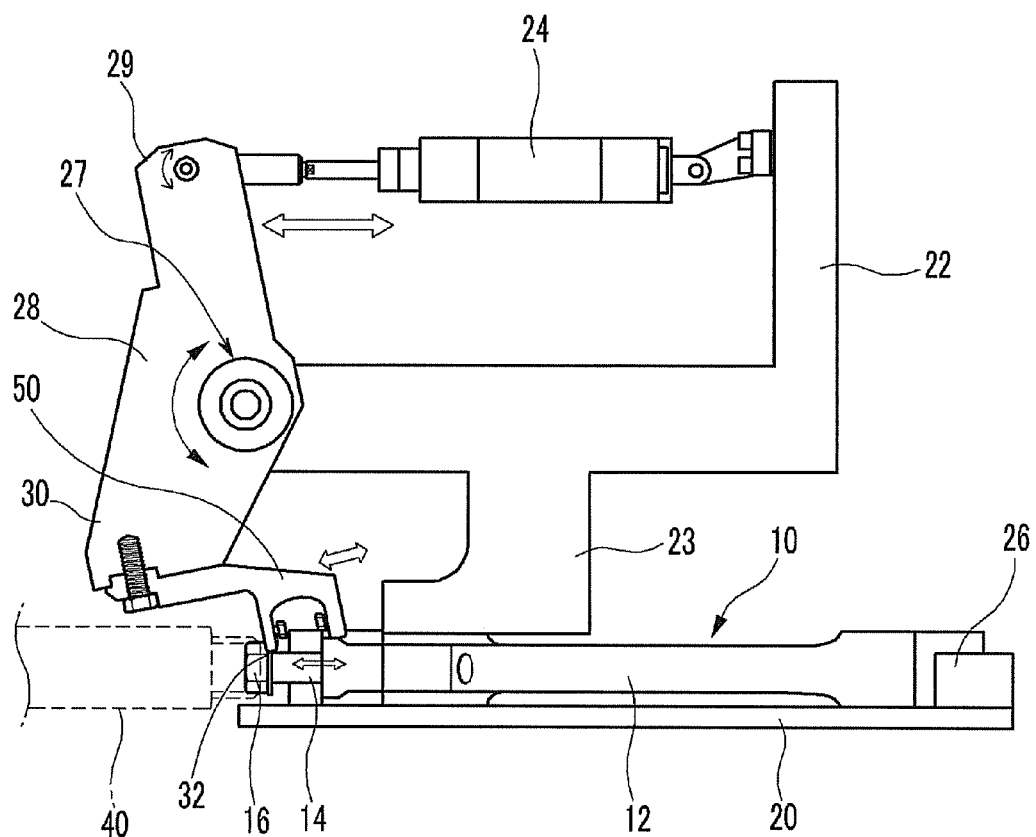
FIG. 3 is a drawing showing operation of a device for removing particles of a connecting rod according to an exemplary embodiment of the present invention.

Hereinafter, referring to FIG. 3, an operation mode of the device for removing particles is explained.

The rod 12 of the connecting rod 10 disposed on the base plate 20 is fixed by the clamp protrusion 23. The end of the rod 12 is then supported by the fixing block 26 and clamped by the clamp 22.

The connecting bracket 50 is then moved toward the cap 14 and the engage bolt 32 fixing the cap 14 to the connecting bracket 50

Thereafter, the vibration cylinder 24 is expanded and the nut runner 40 temporarily engages the bolt 16 into the cap 14 and the rod 12.

Using pressure by the expansion of the vibration cylinder 24, the particles on the rod 12 and the cap 14 can be removed.

The nut runner 40 then partially disengages the bolt 16 for removing the particles with vibration and the vibration cylinder 24 is contracted. In this state, the nut runner 40 maintains holing the bolt 16 and the bolt 16 is maintained partially disengaged state.

Then the vibration cylinder 24 is expanded and contracted repeatedly and the particles are removed. The link portion 28 pivots around the center portion 27 by expansion and contraction of the vibration cylinder 24.

As a result, the cap 14 is bumped into the rod 12 and the particles adhered to split surface of the cap 14 and the rod 12 are removed.

In this process, the nut runner 40 holds the bolt 16 so that impact that can be transferred to the bolt 16 can be reduced. Thus, damage, which can be generated to the bolt 16 and the tap 15 engaged with the bolt 16, can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for removing particles from a connecting rod comprising:
   a clamp fixing a rod of a connecting rod disposed on a base plate;
   a vibration cylinder disposed to the clamp, the vibration cylinder arranged in parallel with and offset from the base plate and the rod on the base plate; and
   a driving unit pivotably supported by the clamp and connected to the vibration cylinder to reciprocate a cap of the connecting rod in an opposite direction to reciprocation of the vibrating cylinder by vibrating pivotal movement according to movement of the vibration cylinder.

2. The device of claim 1, wherein the driving unit comprises:
   a link portion including a center portion thereof which is pivotally connected to the clamp, a first end thereof which is connected to the vibration cylinder, and a second end thereof; and
   a connecting bracket which is configured to the second end of the link portion and holds the cap.

3. The device of claim 2, wherein the device further comprises a fixing block that is disposed on the base plate and supports an end of the rod.

* * * * *